US005142482A

United States Patent [19]

Sansone

[11] Patent Number: 5,142,482

[45] Date of Patent: Aug. 25, 1992

[54] MAILING SYSTEM WITH INFORMATION FEEDBACK

[75] Inventor: Ronald P. Sansone, Weston, Conn.

[73] Assignee: Pitney Bowes Inc., Stamford, Conn.

[21] Appl. No.: 785,910

[22] Filed: Nov. 4, 1991

Related U.S. Application Data

[63] Continuation of Ser. No. 416,731, Oct. 3, 1989, abandoned.

[51] Int. Cl.[5] .............. G06F 15/20

[52] U.S. Cl. .............. 364/478; 270/58; 364/464.03

[58] Field of Search .............. 364/478, 464.02, 464.03, 364/466; 235/375, 432; 270/54-58; 177/4, 25.12, 25.13, 25.15; 53/266 A, 504, 284.3; 209/584, 900

[56] References Cited

U.S. PATENT DOCUMENTS

| | | | |
|---|---|---|---|
| 3,899,165 | 8/1975 | Abram et al. | 270/58 X |
| 4,516,209 | 5/1985 | Scribner | 364/466 |
| 4,527,468 | 7/1985 | Piotroski | 364/478 X |
| 4,547,856 | 10/1985 | Piotroski | 364/478 |
| 4,585,220 | 4/1986 | Zemke et al. | 270/58 X |
| 4,674,052 | 6/1987 | Wong et al. | 364/464.03 |

*Primary Examiner*—Joseph Ruggiero
*Attorney, Agent, or Firm*—Peter Vrahotes; Melvin J. Scolnick; David E. Pitchenik

[57] ABSTRACT

A system for processing mail pieces such as letter mail wherein the mail and the mail data are certified during such processing is provided. Information relative to the anticipated weight and thickness of each mail piece is supplied to a processor from a central computer. During processing the weight and thickness of each mail piece is measured, and if there is a difference between the actual determination and the anticipated parameters, the information is fed back to the computer so that corrections can be made for future processing. In addition, print quality of the mail is determined with regard to accuracy of addresses and readability.

18 Claims, 2 Drawing Sheets

MAILING SYSTEM WITH INFORMATION FEEDBACK

This application is a continuation of application Ser. No. 416,731, filed Oct. 3, 1989 now abandoned.

RELATED CASES

Co-pending U.S. patent applications, having related subject matter are as follows: U.S. Pat. No. 5,005,124 filed Aug. 23, 1988 and entitled METHOD AND APPARATUS FOR CATEGORIZING AND CERTIFYING MAIL; U.S. Pat. No. 5,077,694 filed Dec. 16, 1988 and entitled CENTRALIZED MAIL USE DATA BASE; U.S. Pat. No. 4,949,272 filed Dec. 16, 1988 and entitled FLEXIBLE BILLING RATE FOR MAIL COMMUNICATION SYSTEMS; Ser. No. 282,713 filed Dec. 13, 1988 and entitled APPARATUS AND METHOD FOR THE PROCESSING OF MAIL; and U.S. Pat. No. 5,008,827 entitled CENTRALIZED POSTAGE DATA COMMUNICATION NETWORK, filed Dec. 16, 1988.

BACKGROUND OF THE INVENTION

Throughout the history of the Post Office, there has been a gradual evolution whereby the Post Office encourages mailers to prepare their mail in such a way as to reduce the effort required on the part of the Post Office for processing such mail. As an inducement to the mailer to prepare the mail in such a manner so as to bring about faster mail processing, the Post Office offers mailers a discount for such things as pre-sorted mail, printing of zip codes and pre-printed bar codes. Discounts are given also when the mail is produced in a manner allowing automatic processing with machines such as optical character recognition (OCR) sorters and bar code readers and sorters.

Even with the present reduced postage rates for presorted zip code mail and the like, the Post Office is experiencing difficulties in processing the mail, not only because of the ever increasing volume of mail that is required to be delivered, but also because a significant amount of mail presented to the Post Office does not have the required postage. The mail pieces may not have sufficient postage because the anticipated weight of a mail piece may be greater than expected. In equipment for processing large amounts of mail, it is frequently a practice to determine the weight of the inserts of a mail piece and together with the known weight of the envelope, the total weight of the mail piece is then calculated and postage applied in accordance with that calculated weight. The mail pieces are placed in trays and these trays are delivered to the Post Office. Frequently, errors occur with regard to the calculated weight and these errors cause delays in the Post Office. In the same way, the thicknesses of the mail pieces are estimated based upon the number of inserts and the anticipated thicknesses thereof. If the mail pieces are too thick, they may prove difficult to process in Post Office automatic processing equipment, or may be beyond the requirements of the postal regulations with regard to mail thickness.

SUMMARY OF THE INVENTION

The present invention relates to a system for processing mail pieces, such as letter mail, wherein the mail is certified for weight, mail piece thickness, readability and number of mail pieces being submitted to a post office. Information relative to the anticipated weight and thickness of each mail piece is stored in a computer and uploaded to a processor. Based upon the stored data, the estimated amount of postage and number of mail pieces that can be placed in a tray can be approximated. During processing, the weights and thicknesses of the mail pieces are first calculated based upon stored parameters. These mail piece parameters are then measured, and if there is a discrepancy, the information is fed back to the computer so that future runs will have the corrected weight, thickness and postage. In addition, the readability of the mail pieces is established and if there are errors, corrections can be made in the database or printer as required. In this way, a dynamic system is presented wherein the data relative to the mail that is stored in the computer is constantly updated and reexamined so that there is an active monitoring feature.

BRIEF DESCRIPTION OF THE DRAWING

In the drawing, the dotted lines represent data flow and the solid lines represent article conveyance.

DETAILED DESCRIPTION OF THE PREFERRED EMBODIMENTS

Figure 1:
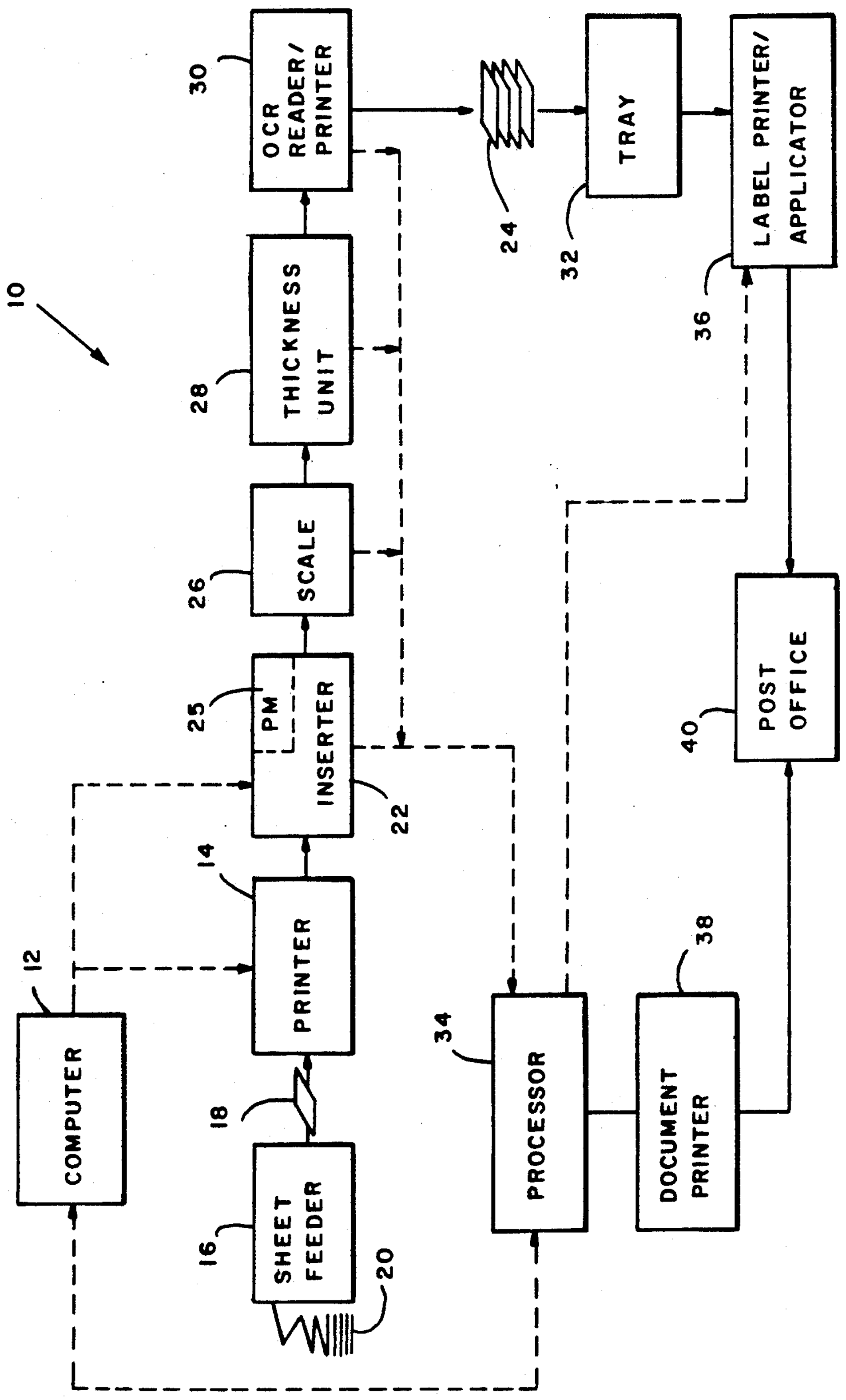
FIG. 1 is a block diagram showing the various components of the system that carry out the principles of this invention.

With reference to FIG. 1, a mail processing system is shown generally at 10 and includes a mailers computer 12 that may be a main frame computer such as an IBM Model 4300 series available from IBM Corporation of Armonk, N.Y. It will be appreciated this main frame computer 12 could download data to a number of mail rooms but, for purposes of clarity, it will be described as communicating with only one mail room. The computer 12 is in communication with a printer 14 that has a sheet feeder 16 in operative communication therewith. The purpose of the connection between the computer 12 and the printer 14 is to provide data to the printer to cause the printing of the names and addresses of mail recipients on address sheets 18 that are fed by the sheet feeder 16 as well as variable data such as bills, account statements, late payment notices and the like. The sheets 18 may be in the form of perforated sheets of a web that are subsequently separated by a device such as a Model 3370 burster available from Pitney Bowes Inc. Downstream from the printer 14 is an inserter 22 to which the sheets 18 are fed. Inserters 22 are well known devices for placing inserts into envelopes and sealing the envelopes. An example of commercially available inserters are the Model 8300 series inserters available from Pitney Bowes Inc. which may also include a burster available as Model No. 8353. With such inserters 22, window envelopes are normally used with address sheets which are fed from the printer 14 to the inserter so that the address sheets will be inserted in an envelope and located adjacent to the window so as to have the printed address exposed and the inserts, as well as other printed sheets 18, will be placed behind these address sheets. These inserts are normally advertisements, notices, public announcements and the like. The envelope, together with the address sheet and inserts, upon being sealed, will constitute a mail piece 24. The inserter 22 may optionally include a postage meter 25 whose value is set by computer 12 generated data when metered mail is to be processed. If permit mail is being processed, a postage meter 25 is not required.

The mail piece 24 will be transported from the inserter 22 to a scale 26 that is capable of weighing the mail pieces rapidly. An example of such a scale 26 is described in U.S. Pat. No. 4,178,018. Upon obtaining the weight of the mail piece 24, it is then forwarded to a thickness measuring unit 28 which measures the thickness of the mail piece. A device such as a linear or rotary thickness measuring mechanism, laser ranging device or acoustical sensor, all of which are commercially available, can be used for this purpose. After the thickness has been determined, the mail pieces 24 are then delivered to an OCR reader/bar code printer 30 where the postal zip code will be printed on the envelope in the form of a bar code after the address has been read thereon by the OCR reader. Upon a bar code being printed upon the mail pieces 24, they are then placed into a tray 32. Additionally, the address can be read by the OCR reader and a determination made of the readability of the mail. By readability is meant the percentage of mail pieces that can be read by the OCR reader. Such findings will be uploaded to a processor 34.

The processor 34, which may be a PC such as an IBM PS 2 Model 50, is in communication with the main frame computer 12, the inserter 22, the scale 26, the thickness measuring unit 28, and the OCR reader/bar code printer 30. The processor 34 will receive information from these various units for purposes that will be described hereinafter. The processor 34 is also in communication with a label printer 36 that will print a label indicative of the contents and destination of the tray 32 containing mail pieces 24 that have been processed by the system 10 and the label will be affixed thereto either manually or by an automatic process. The processor 34 is also in communication with a document printer 38 that prints a statement sheet that reflects the mail processing results. This statement sheet will contain a certification seal whereby the mailer certifies the accuracy of the parameters of the mail received by the Post Office 40. This statement sheet in the case of permit mail represents postage payment to the Post Office as well as other information sent to a post office facility 40 that will process the mail pieces received from the mailer for delivery to the addressees. For metered mail, the postage indicia will be printed on each envelope and the statement sheet will include the other information such as weight, thickness and readability of the mail pieces as well as payment for any postage shortfall as required. The shortfall payment can be made by a postage meter impression of the statement sheet.

In operation, the main frame computer 12 will have data either stored therein, or uploaded, that represents the addressee and materials to be sent thereto including the number of inserts to be placed in an envelope by the inserter 22. The computer 12 calculates the weight of each mail piece based upon the number of inserts, the address sheet, the envelope and the assumed weights of these items. The computer 12 will direct control commands to the printer 14 to print codes on the address sheets that will be read by the inserter 22 for the purpose of determining which inserts housed in the bins of the inserter are to be inserted into each envelope. As is well known, an inserter will have a number of bins, as for example 6, each of which holds inserts which are identical in each bin, but different in character and perhaps weight from the inserts in the other bins. In addition, the inserter 22 will have a bin for holding envelopes, preferably windowed envelopes. Inserts from all the bins may not be inserted into each envelope as the computer 12 determines which of the bins is to supply an insert based upon the code printed on the address sheet. The main frame computer 12 will also have an address list based upon the National Change of Address List and certified pre-sort software whereby the addresses can be printed on the sheets 18, data can be supplied to the printer and certification procedures can be followed. The main frame computer 12 will control the printer 14 whereby zip code breaks are printed onto the sheets 18 as part of the inserter control code for a particular mail run. In addition, the main frame computer 12 will supply to the processor 24 key line data, calculated mail piece weights and thicknesses, pre-sort data and postage calculations based upon the calculated weights and composition of the mail pieces 24. This information will then be input to the processor 34.

The printer 14 will print the recipient address and key lines upon address sheets 18 and personal information sheets and feed these sheets to the inserter 22 which adds inserts with the address exposed through the window. The envelope will then be sealed to form a mail piece 24. The mail piece 24 will then be sent to the high speed scale 26 which will communicate to the processor 34 the weight of the mail piece. The mail piece 24 will then be forwarded to the thickness dimension measurement unit 28 wherein the thickness of the mail piece will be determined. This information will also be sent to the processor 34. Based upon the thickness of the envelopes, the number of mail pieces in a tray can be determined.

At the OCR reader/bar code printer 30 a check will be made as to whether the address is readable, the extent of the readability, and correlation between the printed address and the zip code. The zip code will then be printed upon the envelope in postal bar code form. The readability and correlation of the address is then downloaded to the processor 34. The mail pieces 24 are then delivered to and collected within the trays 32.

Upon receipt of the information from the scale 26, thickness measuring unit 28 and OCR reader 30, the processor 34 will then compare the data received from these units with the information originally received from the main frame 12. If the data from the units correlates to the data originally received from the main frame 12, nothing is done. If there are discrepancies, the processor 34 will communicate to the main frame 12 those elements where there is inconsistency. Either corrections in the main frame computer 12 memory can be made immediately in the case of gross systematic errors and efforts made to determine why the original calculations were not correct so as to prevent future errors. If the errors are of a minor nature, mail processing can continue and any shortfall postage can be paid as described previously. In addition, the processor 34 will cause the document printer 38 to print a document, such as a postal form 3602, with additional postage printed thereon and a certification document whereby the certification in terms of numbers, weight and rate of the mail pieces 24, and address print quality for deliverability is certified. On this basis, when the Post Office 40 receives the mail trays 32, it is aware that the mail can be processed since it has been certified by the system 10.

Figure 2:
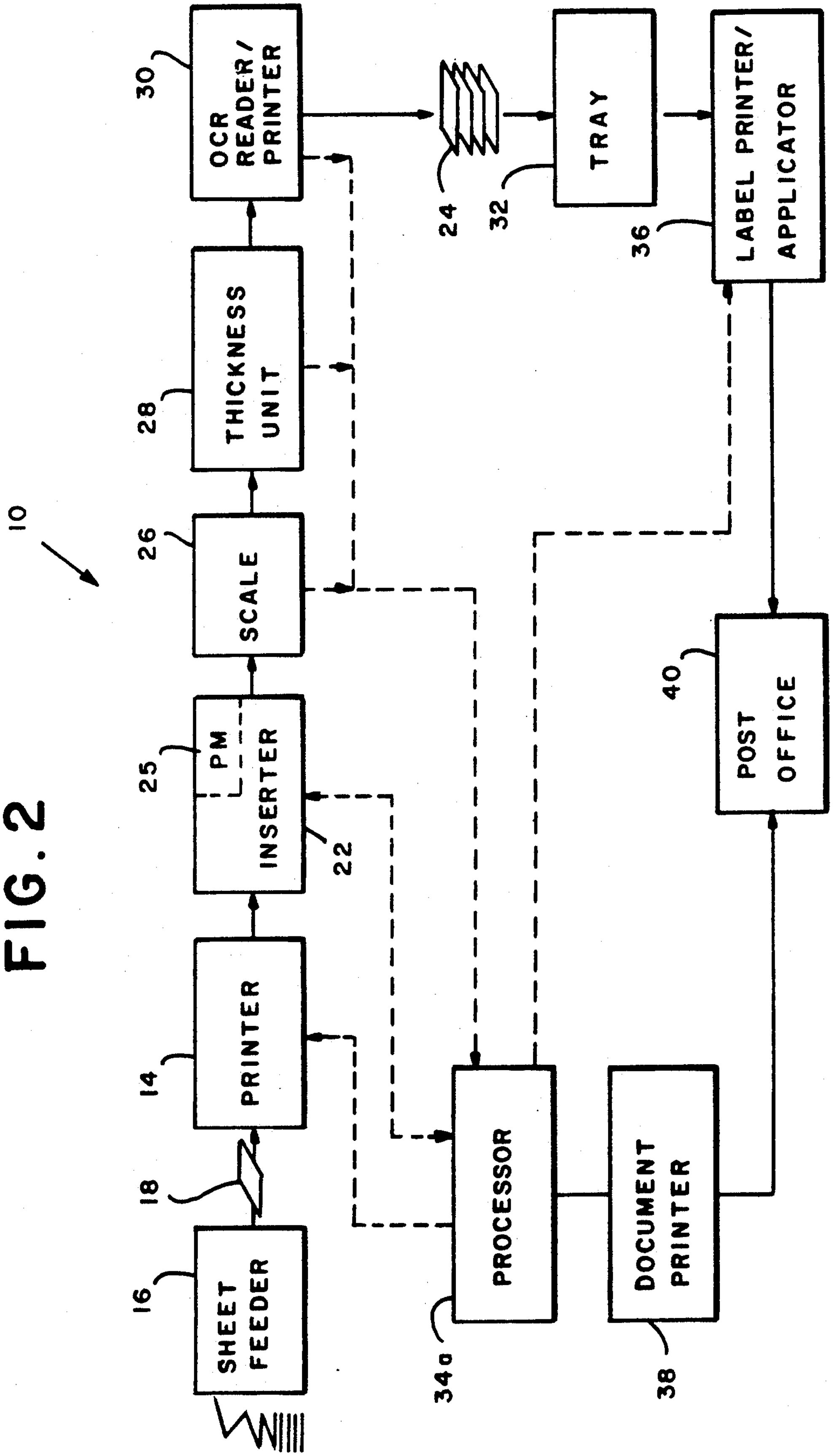
FIG. 2 is a block diagram of alternative embodiment of the invention wherein the same reference numbers are used for the same elements as in FIG. 1.

Although the invention has been described with a mainframe computer 12 and a processor 34, it will be appreciated that the invention can be carried out using a single data processing machine as is shown in FIG. 2.

The processor 34*a* would have the database stored therein that has information described with regard to the mainframe computer 12 in FIG. 1, but performed along with the other functions described in a single processor 34*a*.

Thus, what has been shown and described is a system whereby a mailer processes his mail in such a way that the parameters of the mail are initially determined and stored in a main frame computer that will then control the processing of such mail. In addition, checks are made to assure that the original data contained within the main processor are accurate and a constant check of the information is maintained. Where errors occur, these errors can be corrected so such errors are eliminated in the mainframe 12 and the postal documentation is rendered correct.

What is claimed is:

1. A system for processing and certifying mail, the combination comprising:

- a computer,
- a printer in communication with said computer to receive data therefrom,
- a sheet feeder for feeding sheets to said printer,
- an inserter for receiving sheets from said printer, said inserter being in communication with said computer for inserting sheets and selected inserts into an envelope to form a mail piece,
- a scale for receiving mail pieces individually from said inserter,
- a mail piece thickness measuring device for measuring mail piece thickness, and
- a data processor in communication with said computer, said scale and said thickness measuring device.

2. The system of claim 1 including a second printer in communication with said data processor.

3. The system of claim 1 including an OCR reader/bar code printer for reading addresses on the mail pieces and printing bar codes on the mail pieces.

4. The system of claim 3 including label printing means in communication with said data processor for printing labels containing mail piece information for affixing to trays.

5. The system of claim 1 wherein said data processor has means for determining the number of mail pieces in a tray.

6. A system for processing and certifying mail, the combination comprising:

- a computer,
- printing means in communication with computer said to receive data therefrom,
- first feeder means for feeding sheets to said printer,
- inserter means in communication with said computer and having means for inserting sheets and selected inserts into an envelope to form a mail piece,
- second feeder means for feeding sheets to said inserter means,
- a scale,
- means for conveying said mail pieces individually from said inserter means to said scale,
- a data processing means in communication with said processing means computer and said scale whereby data from said scale can be uploaded to said computer.

7. The system of claim 6 including thickness measuring means for measuring mail piece thickness in communication with said data processing means and means for feeding mail pieces to said thickness measuring means.

8. The system of claim 6 including an OCR reader/bar code printer for reading addresses on the mail pieces and printing bar codes on such mail pieces.

9. The system of claim 6 including label printing means for printing labels containing mail piece information for affixing to trays.

10. The system of claim 6 wherein said data processing means includes means for determining the number of mail pieces in a tray.

11. A method of processing and certifying mail, the steps comprising:

- supplying mail address data to a printer,
- feeding a sheet to the printer and printing an address thereon,
- feeding the addressed sheet to an inserter,
- inserting the addressed sheet and selected inserts into an envelope to form a mail piece,
- measuring the weight of each mail piece and thickness, and,
- supplying data relative to the weight and thickness of each mail piece to a processor.

12. The method of claim 11 including reading the address on the mail piece and printing a bar code on the mail pieces in response thereto.

13. The method of claim 12 including supplying mail pieces to a tray and printing a label to be affixed to said tray.

14. The method of claim 13 including determining the number of mail pieces in a tray on the basis of the mail piece thickness.

15. A method of processing and certifying mail, the steps comprising:

- storing mail component data relative to anticipated mail piece weight and thickness and process control commands for an upcoming mail run in a computer,
- downloading the mail component data to a processor,
- supplying control commands in the form of mail address data to a printer,
- feeding a sheet to the printer and printing an address and inserter control data thereon,
- feeding the sheet to an inserter,
- inserting the sheet and selected inserts into an envelope to form a mail piece in response to the control data,
- measuring the mail piece thickness, and,
- supplying data relative to the weight and thickness to the processor,
- comparing the measured weight and envelope thickness of the mail piece with the mail component data stored in the computer, and
- determining if the measured data corresponds to the stored mail component data.

16. The method of claim 15 including reading the address on the mail piece and printing a bar zip code on the mail piece.

17. The method of claim 16 including supplying mail pieces to a tray and printing a main information label and affixing the label to said tray.

18. The method of claim 17 including determining the number of mail pieces in a tray on the basis of the mail piece thickness.

* * * * *